US010700923B1

(12) United States Patent
Holmer

(10) Patent No.: US 10,700,923 B1
(45) Date of Patent: Jun. 30, 2020

(54) NETWORK DISTURBANCE NOTIFICATION SYSTEM

(71) Applicant: Lance Holmer, Flat Rock, IL (US)

(72) Inventor: Lance Holmer, Flat Rock, IL (US)

( * ) Notice: Subject to any disclaimer, the term of this patent is extended or adjusted under 35 U.S.C. 154(b) by 0 days.

(21) Appl. No.: 16/253,279

(22) Filed: Jan. 22, 2019

(51) Int. Cl.
*H04W 24/08* (2009.01)
*H04L 12/24* (2006.01)
*H04W 84/12* (2009.01)

(52) U.S. Cl.
CPC ......... *H04L 41/0686* (2013.01); *H04W 24/08* (2013.01); *H04W 84/12* (2013.01)

(58) Field of Classification Search
CPC ............... H04W 24/08; H04L 41/0213; H04L 41/0686; H04L 43/106; H04Q 9/00; H04Q 2209/40; H04Q 2209/30
See application file for complete search history.

(56) References Cited

U.S. PATENT DOCUMENTS

| 5,566,339 | A | 10/1996 | Perholtz |
| 5,784,441 | A | 7/1998 | Davis |
| 6,137,868 | A | 10/2000 | Leach |
| 7,586,420 | B2 | 9/2009 | Fischer |
| 8,810,421 | B2 | 8/2014 | Deaver, Sr. |
| 9,049,019 | B2 | 6/2015 | Austermann |
| 2010/0027469 | A1* | 2/2010 | Gurajala ............... H04W 24/00 370/328 |
| 2015/0009841 | A1* | 1/2015 | Lee ....................... H04L 5/0073 370/252 |
| 2018/0234745 | A1* | 8/2018 | Schweitzer, III ........ H04Q 9/00 |

FOREIGN PATENT DOCUMENTS

WO        1999053627        10/1999

* cited by examiner

*Primary Examiner* — Wei Zhao
(74) *Attorney, Agent, or Firm* — Kyle A. Fletcher, Esq.

(57) ABSTRACT

The network disturbance notification system monitors one or more computer networks watching for indications of an interruption of service. As non-limiting examples, the interruption of service may be caused by a network outage or an equipment failure. Responsive to detecting an interruption of service, the invention may attempt to notify a user by sending one or more notification messages via one or more notification channels. As non-limiting examples, emails, text messages, pager messages, and/or faxes may be sent via cell phone networks, wired networks, wireless networks, and/or land-line based telephone system. The network disturbance notification system may operate from AC power with battery backup. In some embodiments, the network disturbance notification system may activate local audible and visual alarms to alert that an interruption of service has occurred. In some embodiments, the invention may monitor the ambient temperature and report the temperature in notifications.

14 Claims, 1 Drawing Sheet

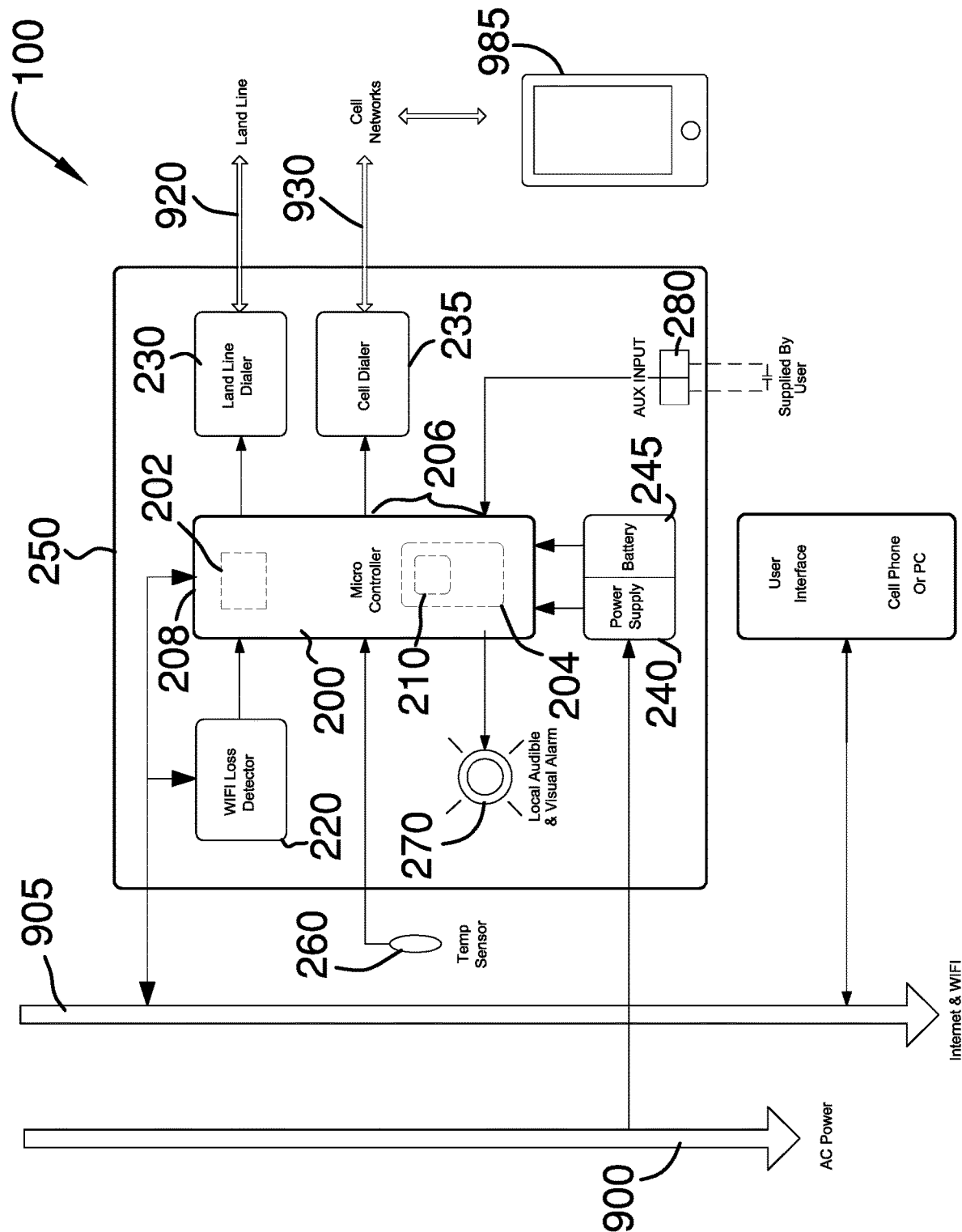

NETWORK DISTURBANCE NOTIFICATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of computer network management, more specifically, a network disturbance notification system.

SUMMARY OF INVENTION

The network disturbance notification system monitors one or more computer networks watching for indications of an interruption of service. As non-limiting examples, the interruption of service may be caused by a network outage or an equipment failure. Responsive to detecting an interruption of service, the invention may attempt to notify a user by sending one or more notification messages via one or more notification channels. As non-limiting examples, emails, text messages, pager messages, and/or faxes may be sent via cell phone networks, wired networks, wireless networks, and/or land-line based telephone system. The network disturbance notification system may operate from AC power with battery backup. In some embodiments, the network disturbance notification system may activate local audible and visual alarms to alert that an interruption of service has occurred. In some embodiments, the invention may monitor the ambient temperature and report the temperature in notifications.

An object of the invention is to monitor one or more networks to detect interruptions of service.

Another object of the invention is to send a notification message to a user upon detecting an interruption of service.

A further object of the invention is to monitor the ambient temperature and include the temperature in notification messages.

Yet another object of the invention is to provide local audible and/or visual alarms.

These together with additional objects, features and advantages of the network disturbance notification system will be readily apparent to those of ordinary skill in the art upon reading the following detailed description of the presently preferred, but nonetheless illustrative, embodiments when taken in conjunction with the accompanying drawings.

In this respect, before explaining the current embodiments of the network disturbance notification in detail, it is to be understood that the network disturbance notification system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the network disturbance notification system.

It is therefore important that the claims be regarded as including such equivalent construction insofar as they do not depart from the spirit and scope of the network disturbance notification system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 1 is a block diagram of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIG. 1.

The network disturbance notification system 100 (hereinafter invention) comprises a micro controller 200, a WIFI loss detector 220, a land line dialer 230, a cell dialer 235, a power supply 240, one or more batteries 245, and an enclosure 250. The invention 100 may be adapted to detect an interruption of service that a user may experience with an Internet Service Provider and may notify the user of the interruption of service.

The micro controller 200 may monitor one or more network interfaces 208 and the WIFI loss detector 220 to determine if one or more computer networks 905 are operational. As non-limiting examples, the one or more computer networks 905 may comprise one or more wired networks and/or one or more wireless networks. If any of the one or more computer networks 905 are determined to be non-operational the micro controller 200 may be adapted to notify the user to alert the user of the interruption of service.

The one or more computer networks 905 may be determined to be non-operational in a number of different ways. As non-limiting examples, 1) the micro controller 200 may detect a failure to obtain an IP address assignment from a DHCP server if dynamic addressing is in use. 2) the micro controller 200 may detect a failure to ping or otherwise communicate with a computer, router, printer, or other node in the network. 3) the micro controller 200 may detect a failure to achieve one or more predefined network error thresholds. 4) the micro controller 200 may detect a failure to achieve one or more predefined network performance thresholds. 5) the micro controller 200 may detect that an SSID for a wireless router is not accessible or that a wireless router will not connect. 6) the micro controller 200 may detect that a previously established network connection has been dropped. In some embodiments, the one or more computer networks 905 may be determined to be non-operational on the LAN side of an ISP's cable modem or on the WAN side of the ISP's cable modem.

The micro controller 200 may be adapted to notify the user of the interruption of service by transmitting one or more notification messages via one or more notification channels. As non-limiting examples, the one or more notification channels may comprise one or more cell phone networks 930, the one or more wired networks, the one or more wireless networks, a land-line based telephone system 920, or a combination thereof. It is possible that at least one of the one or more notification channels may be unavailable due to the interruption of service, however the micro controller 200 may attempt using any or all of the one or more notification channels to maximize the probability that the one or more notification messages will be delivered.

As non-limiting examples, the one or more notification messages may comprise one or more emails, one or more SMS text messages, one or more MMS text messages, one or more pager messages, one or more faxes, or combinations thereof.

The micro controller 200 may comprise a microprocessor 202 and one or more memory devices 204 wherein the one or more memory devices 204 contain instructions for causing the microprocessor 202 to control the sequence and timing of network monitoring and outage notification.

The microprocessor 202 may be a computer processor that incorporates the functions of a central processing unit in the form of one or more integrated circuits. The microprocessor 202 may be a multipurpose, clock driven, register based, digital-integrated circuit. The microprocessor 202 may accept binary data as input, process it according to instructions stored in the one or more memory devices 204, and provide results as output. The microprocessor 202 may contain both combinational logic and sequential digital logic. The microprocessor 202 may operate on numbers and symbols represented in the binary numeral system.

The one or more memory devices 204 may comprise one or more electronic circuits that store information for immediate use by a computer or other digital electronics. The one or more memory devices 204 may comprise connections allowing a subset of the one or more memory devices 204 to be addressed, connections to read or write the subset of the one or more memory devices 204, and connections to control the reading and writing of the subset of the one or more memory devices 204. The one or more memory devices 204 may be directly or indirectly coupled to the microprocessor 202, which may read and write the content of the one or more memory devices 204. The one or more memory devices 204 may be categorized as SRAM, DRAM, ROM, PROM, EPROM, EEROM, Flash NVRAM, or other designations based upon characteristics of the one or more memory devices 204. As non-limiting examples, characteristics of the one or more memory devices 204 may include the need to be refreshed in order to retain its contents, the ability to retain its contents when power is removed, the ability to change contents that have been programmed into the one or more memory devices 204, or combinations thereof.

The micro controller 200 may further comprise one or more input/output ports 206 and the one or more network interfaces 208. The one or more input/output ports 206 may be digital signals that are controlled by the micro controller 200, are sensed by the micro controller 200, or both. The one or more input/output ports 206 may provide the micro controller 200 with control signals to direct the operations of the invention 100 and to determine the status and health of the invention 100. As non-limiting examples, the micro controller 200 may control operation of the land line dialer 230 and the cell dialer 235 using the one or more input/output ports 206 and may determine that the WIFI loss detector 220 has detected the interruption of service using the one or more input/output ports 206.

The one or more network interfaces 208 may be communication interfaces between the invention 100 and other devices. As non- limiting examples, the other devices may be computers and printers on the e LAN, the ISP's cable modem, and/or computers on the WAN. As non-limiting examples, the one or more network interfaces 208 may be communication interfaces between the invention 100 and the one or more wired networks, the one or more wireless networks, or combinations thereof.

The WIFI loss detector 220 may be a monitor for the one or more wireless networks. The WIFI loss detector 220 may produce an indication for erroneous or impaired operation of the one or more wireless networks. The WIFI loss detector 220 may comprise one or more transceivers that can communicate with the one or more wireless networks. The WIFI loss detector 220 may further comprise one or more interfaces to the micro controller 200 for providing status and error indications to the micro controller 200. The WIFI loss detector 220 may be implemented as one or more electronic circuits, as one or more software routines running on the microprocessor 202, or a combination thereof.

The land line dialer 230 may be an interface to the land-line based telephone system 920. The land line dialer 230 may electrically connect to a phone line. The land line dialer 230 may change the voltage or other electrical characteristics of wiring in the phone line in order to hang up, answer, or dial a telephone number to establish a connection using the land-line based telephone system 920.

The cell dialer 235 may be an interface to the one or more cell phone networks 930. The cell dialer 235 may comprise one or more transceivers that operate using frequencies and protocols that are compatible with the one or more cell phone networks 930. The cell dialer 235 may establish and terminate connections via the one or more cell phone networks 930.

The land line dialer 230 and/or the cell dialer 235 may transmit audio tones that may be understood by a modem or modem -like device on the other end of the connection. In some embodiments, the land line dialer 230 and/or the cell dialer 235 may transmit pre-recorded or synthesized audio to send a voice message over the connection. As a non-limiting example, the connection may be adapted to deliver the audio message to a cell phone of the user to report the interruption of service noted by the micro controller 200.

The power supply 240 may convert AC power obtained from AC power lines 900 into AC or DC voltage levels that are used by the invention 100.

The one or more batteries 245 may comprise one or more energy-storage devices. The one or more batteries 245 may be a source of electrical energy to operate the invention 100.

The one or more batteries 245 may be replaceable or rechargeable. The one or more batteries 245 may be recharged by the power supply 240 when AC power is available. The invention 100 may operate from the one or more batteries 245 when AC power is not available.

The micro controller 200 may take steps to conserve power when operating from the one or more batteries 245. As a non-limiting example, the micro controller 200 may reduce the frequency of the one or more notification messages when operating from the one or more batteries 245.

The enclosure 250 may be a housing for the micro controller 200, the WIFI loss detector 220, the land line dialer 230, the cell dialer 235, the power supply 240, the one or more batteries 245, and/or other components of the invention 100. The enclosure 250 may be mountable on a wall or a flat surface such as a shelf or counter.

The invention 100 may further comprise a temperature sensor 260, a local alarm 270, an auxiliary input 280, or combinations thereof. The temperature sensor 260 may determine the local ambient temperature in the room where the invention 100 is located. The micro controller 200 may send the one or more notification messages to report a temperature that is above or below predefined thresholds, may include temperature readings in the one or more notification messages sent for other reasons, or a combination thereof.

The local alarm 270 may be one or more audible and/or visual indicators accessible on the enclosure 250. The micro controller 200 may activate the local alarm 270 whenever the interruption of service is detected or for other predefined conditions. The local alarm 270 may be deactivated whenever the interruption of service or other activating condition is resolved, the local alarm 270 is manually reset, or combinations thereof.

The auxiliary input 280 may be an input to the micro controller 200 that may be controlled directly by an external device or application. The auxiliary input 280 may be adapted to accept an input signal representing a condition specific to the user environment. The micro controller 200 may send the one or more notification messages to report changes in the state of the auxiliary input 280, may include the state of the auxiliary input 280 in the one or more notification messages sent for other reasons, or a combination thereof.

DEFINITIONS

As used in this disclosure, "AC" is an acronym for alternating current.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "couple", "couples", "coupled" or "coupling", refer to connecting, either directly or indirectly, and does not necessarily imply a mechanical connection.

As used herein, the words "data" and "information" are used interchangeably to refer to raw, unprocessed facts and to facts that have been processed, structured, organized, or presented in a context that makes the facts useful.

As used in this disclosure, "DC" is an acronym for direct current.

As used here, "fax" or "facsimile" may refer to the transmission of scanned material or to the printed reproduction of the material resulting from such a transmission. In its simplest form, the original document is scanned by a first fax machine and transmitted over a telephone connection using audio frequency tones to a second fax machine, which prints a reproduction of the original document. More sophisticated implementations may allow origination and reception of fax transmissions at computer workstations or other computing devices by utilizing technologies such as scanners, email, internet connections, and centralized fax servers. Computing devices may also be able to use an existing document as an original document and may send a representation of the existing document as a fax.

As used in this disclosure, "frequency" is a count of the number of repetitions of a cyclic process has been completed within a set period of time.

As used in this disclosure, a "housing" is a rigid casing that encloses and protects one or more devices.

As used in this disclosure, an "interface" is a physical or virtual boundary that separates two different systems and across which information is exchanged.

As used in this disclosure, a "network" refers to a data communication or data exchange structure where data is electronically transferred between nodes, also known as terminals, which are electrically attached to the network. In common usage, the operator of the network is often used as an adjective to describe the network. As a non-limiting example, a telecommunication network may refer to a network run by a telecommunication organization while a banking network may refer to a network operated by an organization involved in banking.

As used in this disclosure, a "node" is an electrical device that is attached to a network.

As used herein, the terms "processor", "central processor", "central processing unit", "CPU", or "microprocessor" refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure, a "sensor" is a device that quantitatively measures a physical stimulus.

As used in this disclosure, "SMS" is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

As used in this disclosure, "WiFi" refers to the physical implementation of a collection of wireless electronic communication standards commonly referred to as IEEE 802.11x and used for wireless communication between devices.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

As used in this disclosure, "wireless" is an adjective that is used to describe a communication channel that does not require the use of physical cabling.

With respect to the above description, it is to be realized that the optimum dimensional relationship for the various components of the invention described above and in FIG. 1 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A network disturbance notification system comprising:
a micro controller, a WIFI loss detector, a land line dialer, a cell dialer, a power supply, one or more batteries, and an enclosure;
wherein the network disturbance notification system is configured to detect an interruption of service that a user experiences with an Internet Service Provider and to notify the user of the interruption of service;
wherein the micro controller monitors one or more network interfaces and the WIFI loss detector to determine if one or more computer networks are operational;
wherein if any of the one or more computer networks are determined to be non-operational the micro controller is configured to notify the user to alert the user of the interruption of service;
wherein the micro controller is configured to notify the user of the interruption of service by transmitting one or more notification messages via one or more notification channels;
wherein the one or more notification messages comprise one or more emails, one or more short message service (hereinafter SMS) text messages, one or more multimedia media services (hereinafter MMS) text messages, one or more pager messages, one or more faxes, or combinations thereof;
wherein the micro controller comprises a microprocessor and one or more memory devices wherein the one or more memory devices contain instructions for causing the microprocessor to control the sequence and timing of network monitoring and outage notification;
wherein the micro controller controls operation of the land line dialer and the cell dialer using the one or more input/output ports and determines that the WIFI loss detector has detected the interruption of service using the one or more input/output ports.

2. The network disturbance notification system according to claim 1
wherein the microprocessor is a computer processor that incorporates the functions of a central processing unit in the form of one or more integrated circuits;
wherein the microprocessor is a multipurpose, clock driven, register based, digital- integrated circuit;
wherein the microprocessor accepts binary data as input, process it according to instructions stored in the one or more memory devices, and provide results as output;
wherein the microprocessor contains both combinational logic and sequential digital logic;
wherein the microprocessor operates on numbers and symbols represented in the binary numeral system.

3. The network disturbance notification system according to claim 2
wherein the one or more memory devices comprise one or more electronic circuits that store information for immediate use by a computer or other digital electronics;
wherein the one or more memory devices comprise connections allowing a subset of the one or more memory devices to be addressed, connections to read or write the subset of the one or more memory devices, and connections to control the reading and writing of the subset of the one or more memory devices;
wherein the one or more memory devices are directly or indirectly coupled to the microprocessor, which reads and writes the content of the one or more memory devices.

4. The network disturbance notification system according to claim 3
wherein the micro controller comprises one or more input/output ports and the one or more network interfaces;
wherein the one or more input/output ports are controlled by the micro controller, are sensed by the micro controller, or both;
wherein the one or more input/output ports provide the micro controller with control signals to direct the operations of the network disturbance notification system and to determine the status and health of the network disturbance notification system.

5. The network disturbance notification system according to claim 4
wherein the one or more network interfaces are communication interfaces between the network disturbance notification system and other devices.

6. The network disturbance notification system according to claim 5
wherein the WIFI loss detector is a monitor for the one or more wireless networks;
wherein the WIFI loss detector produces an indication for erroneous or impaired operation of the one or more wireless networks;
wherein the WIFI loss detector comprises one or more transceivers that communicate with the one or more wireless networks;
wherein the WIFI loss detector comprises one or more interfaces to the micro controller for providing status and error indications to the micro controller.

7. The network disturbance notification system according to claim 6
wherein the land line dialer is an interface to a land-line based telephone system;
wherein the land line dialer electrically connects to a phone line;
wherein the land line dialer changes the voltage or other electrical characteristics of wiring in the phone line in order to hang up, answer, or dial a telephone number to establish a connection using the land-line based telephone system;
wherein the cell dialer is an interface to the one or more cell phone networks;

wherein the cell dialer comprises one or more transceivers that operate using frequencies and protocols that are compatible with the one or more cell phone networks;

wherein the cell dialer establishes and terminates connections via the one or more cell phone networks;

wherein the land line dialer and/or the cell dialer transmits audio tones that are understood by a modem or modem-like device on the other end of the connection.

8. The network disturbance notification system according to claim 7 wherein the land line dialer and/or the cell dialer transmits pre-recorded or synthesized audio to send a voice message over the connection.

9. The network disturbance notification system according to claim 8 wherein the connection is configured to deliver the audio message to a cell phone of the user to report the interruption of service noted by the micro controller.

10. The network disturbance notification system according to claim 8 wherein the power supply converts AC power obtained from AC power lines into AC or DC voltage levels that are used by the network disturbance notification system;

wherein the one or more batteries comprise one or more energy-storage devices;

wherein the one or more batteries are a source of electrical energy to operate the network disturbance notification system;

wherein the one or more batteries are replaceable or rechargeable;

wherein the one or more batteries are recharged by the power supply when AC power is available;

wherein the network disturbance notification system operates from the one or more batteries when AC power is not available.

11. The network disturbance notification system according to claim 10 wherein the micro controller takes steps to conserve power when operating from the one or more batteries;

wherein the micro controller reduces the frequency of the one or more notification messages when operating from the one or more batteries.

12. The network disturbance notification system according to claim 10 wherein the network disturbance notification system comprises a temperature sensor, a local alarm, an auxiliary input, or combinations thereof;

wherein the temperature sensor determines the local ambient temperature in the room where the network disturbance notification system is located;

wherein the micro controller sends the one or more notification messages to report a temperature that is above or below predefined thresholds, includes temperature readings in the one or more notification messages sent for other reasons, or a combination thereof.

13. The network disturbance notification system according to claim 12 wherein the local alarm is one or more audible and/or visual indicators accessible on the enclosure;

wherein the micro controller activates the local alarm whenever the interruption of service is detected or for other predefined conditions;

wherein the local alarm is deactivated whenever the interruption of service or other activating condition is resolved, the local alarm is manually reset, or combinations thereof.

14. The network disturbance notification system according to claim 12 wherein the auxiliary input is an input to the micro controller that is controlled directly by an external device or application;

wherein the auxiliary input is configured to accept an input signal representing a condition specific to the user environment;

wherein the micro controller sends the one or more notification messages to report changes in the state of the auxiliary input, includes the state of the auxiliary input in the one or more notification messages sent for other reasons, or a combination thereof.

\* \* \* \* \*